United States Patent
Wang et al.

(10) Patent No.: US 9,519,165 B2
(45) Date of Patent: Dec. 13, 2016

(54) AUTOMATED DETECTION METHOD

(71) Applicant: InnoLux Corporation, Miao-Li County (TW)

(72) Inventors: Min-Cheng Wang, Miao-Li County (TW); Gang-Tao Gu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 14/924,433

(22) Filed: Oct. 27, 2015

(65) Prior Publication Data

US 2016/0124253 A1    May 5, 2016

(30) Foreign Application Priority Data

Oct. 31, 2014   (TW) ............... 103137899 A

(51) Int. Cl.
| | | |
|---|---|---|
| *G02F 1/13* | (2006.01) | |
| *G02F 1/1335* | (2006.01) | |
| *G02F 1/1333* | (2006.01) | |
| *G02F 1/1345* | (2006.01) | |

(52) U.S. Cl.
CPC .......... *G02F 1/1309* (2013.01); *G02F 1/1303* (2013.01); *G02F 1/1336* (2013.01); *G02F 1/1345* (2013.01); *G02F 1/13338* (2013.01); *G02F 1/133528* (2013.01); *G02F 2001/133354* (2013.01)

(58) Field of Classification Search
CPC  G02F 1/1309; G02F 1/1336; G02F 1/133528; G02F 1/13338; G02F 1/1303; G02F 1/1345; G02F 2001/133354
See application file for complete search history.

(56) References Cited

U.S. PATENT DOCUMENTS 8,505,189 B2 *  8/2013  Gu ................... G02F 1/133603
                                                29/564
2014/0124121 A1 *  5/2014  Wang .................... G06F 3/041
                                                156/64

FOREIGN PATENT DOCUMENTS

| CN | 203739280 U | 7/2014 |
|---|---|---|
| TW | I356035 B | 1/2012 |
| TW | 201419073 A | 5/2014 |

* cited by examiner

*Primary Examiner* — Tracie Y Green
(74) *Attorney, Agent, or Firm* — Muncy, Geissler, Olds & Lowe, P.C.

(57) ABSTRACT

An automated detection method comprises steps of: moving at least one panel to a first detection station by a first automatic loading device for an automated lighting detection of the panel; assembling the panel with at least one polarizer and at least one circuit board to obtain a display module and moving the display module to a second detection station by a second automatic loading device for an automated optical detection and an automated lighting detection of the display module; and combining the display module and a backlight module to form a display device and moving the display device to a third detection station by a third automatic loading device for an automated lighting detection of the display device.

16 Claims, 12 Drawing Sheets

AUTOMATED DETECTION METHOD

CROSS REFERENCE TO RELATED APPLICATIONS

This Non-provisional application claims priority under 35 U.S.C. §119(a) on Patent Application No(s). 103137899 filed in Taiwan, Republic of China on Oct. 31, 2014, the entire contents of which are hereby incorporated by reference.

BACKGROUND OF THE INVENTION

Field of Invention

The disclosure relates to a detection method and, in particular, to an automated detection method which can be applied to a flat display device.

Related Art

With the progress of technologies, flat display devices have been widely applied to various kinds of fields. Especially, liquid crystal display (LCD) devices, having advantages such as compact structure, low power consumption, less weight and less radiation, gradually take the place of cathode ray tube (CRT) display devices, and are widely applied to various electronic products, such as mobile phones, portable multimedia devices, notebooks, LCD TVs and LCD screens.

A flat display device is a kind of precision device composed of a lot of components, so that a series of detection tasks need to be implemented for different processes and different stages before the products are shipped out of factory, and the detection tasks comprise, for example, detecting the panel's optical characteristic (Mura or not), detecting whether the IC (integrated circuit) driver is normal, detecting whether a breach or scratch occurs on the appearance, etc., so as to guarantee the products' quality. In the conventional lighting detection of the panel for example, operators put the panel to be detected on a lighting detection machine and then operate the detection machine to execute the detection, and move the panel to the next station for the subsequent process or another detection after the detection is completed. However, this kind of manual transportation and detection not only consumes a lot of manpower and time but also results in a low detection efficiency.

Therefore, it is an important subject to provide an automated detection method which can enhance the detection efficiency and decrease the manufacturing cost and time to increase the product competitiveness.

SUMMARY OF THE INVENTION

In view of the foregoing subject, an objective of the disclosure is to provide an automated detection method which can enhance the detection efficiency and decrease the manufacturing cost and time to increase the product competitiveness.

To achieve the above objective, an automated detection method according to this disclosure comprises steps of: moving at least one panel to a first detection station by a first automatic loading device for an automated lighting detection of the panel; assembling the panel with at least one polarizer and at least one circuit board to obtain a display module and moving the display module to a second detection station by a second automatic loading device for an automated optical detection and an automated lighting detection of the display module; and combining the display module and a backlight module to form a display device and moving the display device to a third detection station by a third automatic loading device for an automated lighting detection of the display device.

In one embodiment, the panel is carried by a cassette, a tray or a conveyer and moved to the first detection station by the first automatic loading device.

In one embodiment, the first automatic loading device is a four-axis or six-axis robotic arm.

In one embodiment, the lighting detection of the panel automatically implemented by the first detection station comprises steps of: moving the panel to a positioning dust-removal device by the first automatic loading device so as to remove the dust of the panel and position the panel; moving the panel that has undergone the dust-removal and been positioned to a lighting detection device by a transportation device, so that the lighting detection device implements the lighting detection for the panel; moving the panel that has been detected as normal to a normal area by the transportation device when the result of the panel's detection is normal; and moving the panel that has been detected as abnormal to a reexamination area by the transportation device when the result of the panel's detection is abnormal.

In one embodiment, the second automatic loading device comprises a first tray elevator device and a conveyer, the first tray elevator device moves at least one tray, and the conveyer carries and moves the tray in the second detection station.

In one embodiment, the lighting detection of the display module automatically implemented by the second detection station comprises steps of: moving the tray from a first position to a second position by the first tray elevator device, wherein the tray carries the display module at the second position; moving the tray containing the display module from the second position to an electrical connection device by the conveyer, so that the display module is electrically connected with a plurality of electrical connection elements through the circuit board; moving the tray to an optical detection device by the conveyer, so that the optical detection device implements the optical detection for the display module; moving the tray to a lighting detection device by the conveyer, so that the lighting detection device implements the lighting detection for the display module; marking the display module of the tray by a marking device to differentiate the normal display module from the abnormal display module; moving the tray to an electrical separation device by the conveyer, separating the electrical connection elements from the display module and taking out the display module from the tray; and moving the empty tray to a second tray elevator device by the conveyer, moving the tray from a third position to a fourth position by the second tray elevator device and moving the tray from the fourth position to the first position of the first tray elevator device by the conveyer.

In one embodiment, before the display device is moved to the third detection station by the third automatic loading device, the automated detection method further comprises steps of: taking out the display device from a conveyer by a first loading/unloading mechanism of a loading device and disposing the display device on a positioning carrier mechanism of the loading device for the positioning; moving the display device to a hot pressing device to connect the circuit board to the backside of the backlight module by a hot pressing process; moving the display device to a tearable pasting device to attach a tearable pasting element to the display device by a tearable pasting process; moving the display device to a black-adhesive applying device to apply a black adhesive to the circuit board of the display device by a black-adhesive applying process; and moving the display device to a surface pressing device to decrease the interval between the display module and the backlight module by a surface pressing process.

In one embodiment, before the display device is taken out from the conveyer by the first automatic loading/unloading mechanism of the loading device, the position of the display device is corrected by a position correcting device which is disposed on a side of the conveyer.

In one embodiment, the hot pressing device comprises a second loading/unloading mechanism, a loading stage, a hot pressing mechanism, a turning mechanism and a hot pressing unloading positioning mechanism, the second loading/unloading mechanism takes out the display device from the previous process and disposes the display device on the loading stage and then the display device is moved to the hot pressing mechanism, the hot pressing mechanism connects the circuit board to the backside of the backlight module by the hot pressing process, the turning mechanism turns over the display device, and the hot pressing unloading positioning mechanism moves and positions the display device.

In one embodiment, the tearable pasting device comprises a third loading/unloading mechanism, a tearing mechanism and a tearable pasting positioning mechanism, the third loading/unloading mechanism takes out the display device from the previous process and disposes the display device on the tearable pasting positioning mechanism, the tearing mechanism tears off the tearable pasting element and attach the tearable pasting element to a corresponding position of the display device, and the tearable pasting positioning mechanism moves and positions the display device.

In one embodiment, the black-adhesive applying device comprises a fourth loading/unloading mechanism, at least one first transportation mechanism, at least one black-adhesive applying mechanism and a first unloading mechanism, the fourth loading/unloading mechanism takes out the display device from the previous process and disposes the display device on the first transportation mechanism, the first transportation mechanism moves the display device to a pasting position of the black-adhesive applying mechanism, a light-blocking adhesive is applied to a corresponding position of the display device by the black-adhesive applying mechanism, and the first unloading mechanism moves the display device that has undergone the black-adhesive applying process out of the black-adhesive applying mechanism.

In one embodiment, the surface pressing device comprises a fifth loading/unloading mechanism, a second transportation mechanism, a pressing mechanism and a second unloading mechanism, the fifth loading/unloading mechanism takes out the display device from the previous process and disposes the display device on the second transportation mechanism, the second transportation mechanism moves the display device to a pressing position of the pressing mechanism, the pressing mechanism implements a surface pressing processes for the display device to decrease the interval between the display module and the backlight module, and the second unloading mechanism moves the display device that has undergone the surface pressing process out of the surface pressing mechanism.

In one embodiment, the lighting detection of the display device automatically implemented by the third detection station comprises steps of: moving the display device to a positioning dust-removal device by the third automatic loading device so as to remove the dust of the display device and position the display device; moving the display device that has undergone the dust-removal and been positioned to a lighting detection device by a transportation device, so that the lighting detection device implements the lighting detection for the display device; moving the display device that has been detected as normal to a normal area by the transportation device when the result of the detection of the display device is normal; and moving the display device that has been detected as abnormal to a reexamination area by the transportation device when the result of the detection of the display device is abnormal.

In one embodiment, the automated detection method further comprises a step of: combining the display device and a touch panel to form a touch display device or combining the display module and a touch panel to form a touch display module, and moving the touch display device or the touch display module to a fourth detection station by a fourth automatic loading device for a touch detection and a lighting detection of the touch display device or the touch display module.

In one embodiment, the fourth automatic loading device comprises a third tray elevator device and a conveyer, the third tray elevator device moves at least one tray, and the conveyer carries and moves the tray in the fourth detection station.

In one embodiment, the touch detection and the lighting detection of the touch display device or the touch display module automatically implemented by the fourth detection station comprise steps of: moving the tray from a first position to a second position by the third tray elevator device, wherein the tray carries the touch display device or the touch display module at the second position; moving the tray containing the touch display device or the touch display module from the second position to an electrical connection device by the conveyer, so that the touch display device or the touch display module is electrically connected with a plurality of electrical connection elements through the circuit board; moving the tray to the touch detection device by the conveyer, so that the touch detection device implements a touch function detection for the touch display device or the touch display module; moving the tray to an appearance detection device by the conveyer, so that the appearance detection device implements an appearance detection for the touch display device or the touch display module; moving the tray to a lighting detection device by the conveyer, so that the lighting detection device implements a lighting detection for the touch display device or the touch display module; marking the touch display device or the touch display module by a marking device to differentiate the normal touch display device or touch display module from the abnormal one; moving the tray to an electrical separation device by the conveyer, separating the electrical connection elements from the touch display device or the touch display module and taking out the touch display device or the touch display module from the tray; and moving the empty tray to a fourth tray elevator device by the conveyer, moving the tray from a third position to a fourth position by the fourth tray elevator device and moving the tray from the fourth position to the first position of the third tray elevator device by the conveyer.

As mentioned above, the automated detection method of this disclosure comprises the steps of: moving at least one panel to the first detection station by the first automatic loading device for the automated lighting detection of the panel; assembling the panel with at least one polarizer and at least one circuit board to obtain a display module and moving the display module to the second detection station by the second automatic loading device for the automated optical detection and lighting detection of the display module; and combining the display module and the backlight module to form a display device and moving the display device to the third detection station by the third automatic loading device for the automated lighting detection of the display device. Moreover, in one embodiment, the automated detection method can further comprise the steps of: combining the display device and a touch panel to form a touch display device or combining the display module and a touch panel to form a touch display module, and moving the touch display device or the touch display module to the fourth detection station by the fourth automatic loading device for the touch detection and the lighting detection of the touch display device or the touch display module. Therefore, in comparison with the manual loading and unloading in the conventional art, the automated detection method of this disclosure can automatically implement the loading, unloading and detection, so as to increase the detection efficiency, decrease the manufacturing cost and time and enhance the product competitiveness.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE INVENTION

The present disclosure will be apparent from the following detailed description, which proceeds with reference to the accompanying drawings, wherein the same references relate to the same elements.

Figure 1:
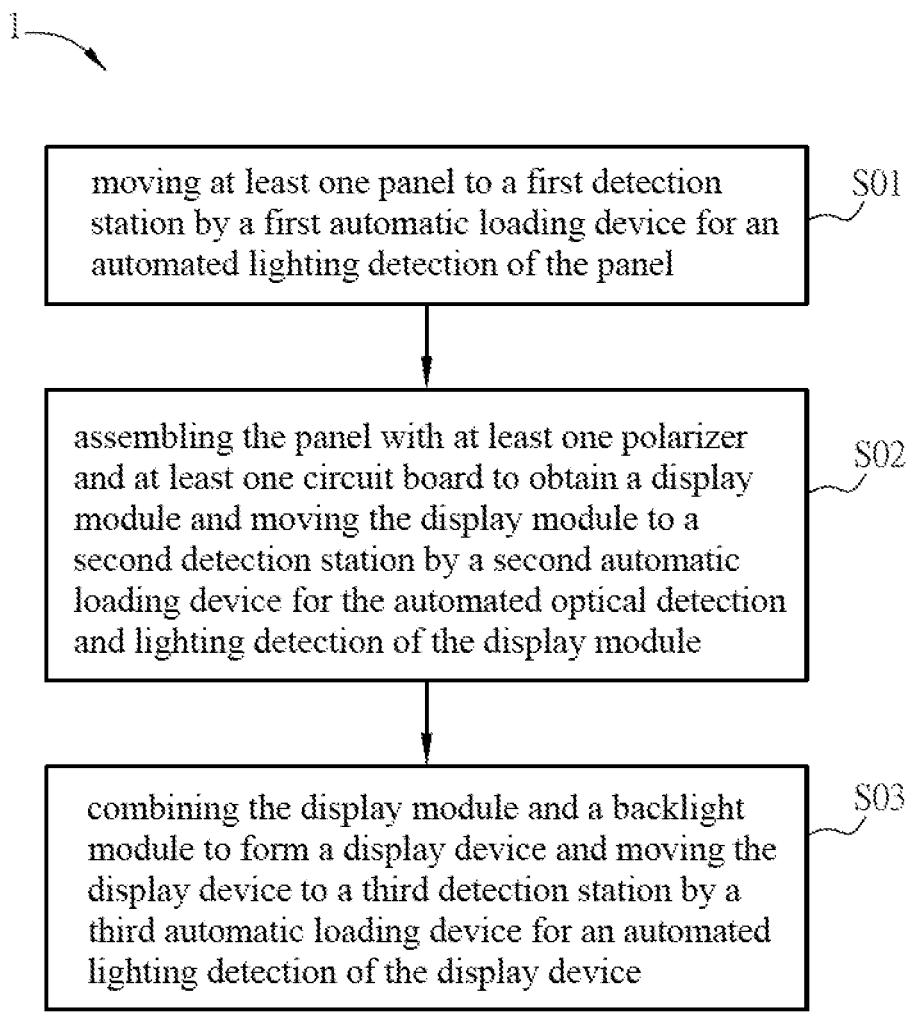
FIG. 1 is a schematic flowchart of an automated detection method of an embodiment of the disclosure.

Refer to FIG. 1, which is a schematic flowchart of an automated detection method of an embodiment of the disclosure.

The automated detection method 1 can be applied to the detection of a flat display device and particular to the automatic detection of an LCD device, such as an optical detection, a lighting detection, an appearance detection, etc.

The automated detection method 1 comprises the steps S01 to S03. The step S01 is to move at least one panel to a first detection station A by a first automatic loading device A1 for an automated lighting detection of the panel. In this embodiment, a plurality of panels are given as an example, and the panels are plain panels, each of which is composed of a thin film transistor (TFT) substrate, a liquid crystal and a color filter (CF) substrate without the upper and lower polarizers and the corresponding control circuit. Moreover, the panels can be carried by a cassette (a cassette can accommodate 60 panels), a tray (a tray can accommodate 12 panels) or a conveyer (or called a production line), and are moved to the first detection station A by the first automatic loading device A1 of the first detection station A in an automatic loading manner. The first automatic loading device A1 can be a four-axis or six-axis robotic arm, but this disclosure is not limited thereto. Besides, the first automatic loading device A1 moves the panels to the first detection station A in a suction manner, so that the lighting detection of the panels can be automatically implemented.

Figure 2A:
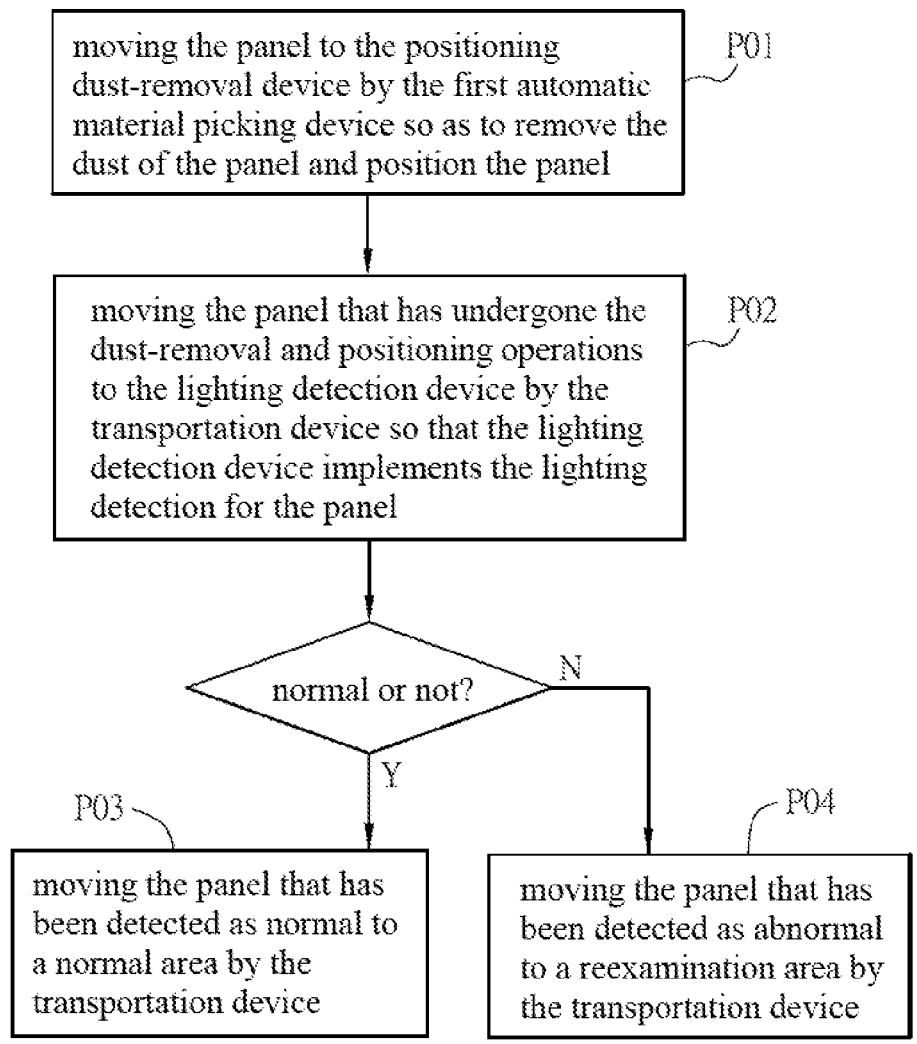
FIG. 2A is a schematic flowchart of the process of the automated lighting detection of the first detection station of FIG. 1.

As below, refer to FIGS. 2A and 2B to illustrate the process of the lighting detection of the panel automatically implemented by the first detection station A. FIG. 2A is a schematic flowchart of the process of the automated lighting detection of the first detection station A of FIG. 1, and FIG. 2B is a schematic diagram of the devices of the first detection station A of FIG. 1.

Figure 2B:
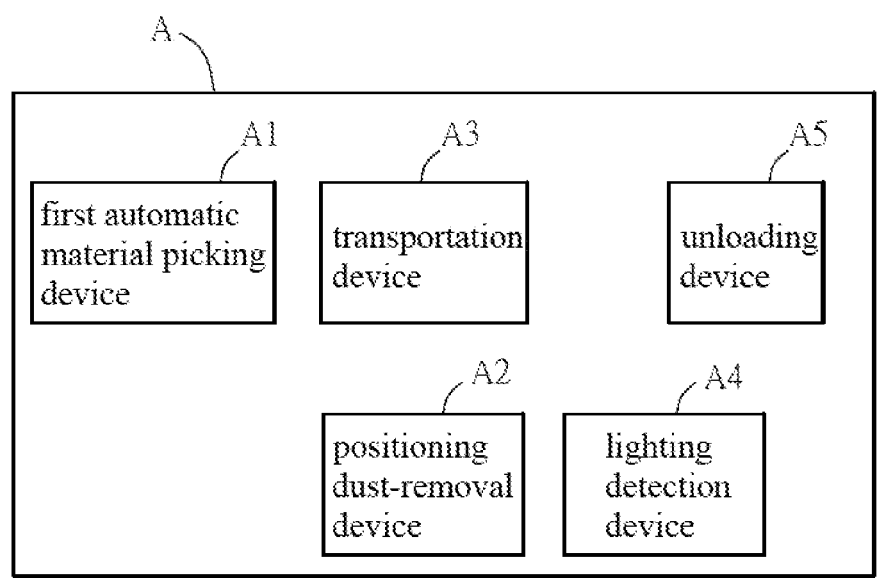
FIG. 2B is a schematic diagram of the devices of the first detection station A of FIG. 1.

As shown in FIG. 2B, the first detection station A is a first automatic picture inspection (API), and can comprise a first automatic loading device A1, a positioning dust-removal device A2, a transportation device A3, a lighting detection device A4 and an unloading device A5. Moreover, as shown in FIG. 2A, the lighting detection of the panel automatically implemented by the first detection station A comprises the steps P01 to P04.

First, the step P01 is implemented as moving the panel to the positioning dust-removal device A2 by the first automatic loading device A1 so as to remove the dust of the panel and position the panel. In this embodiment, the panel is loaded by a robotic arm and then moved to the positioning stage of the positioning dust-removal device A2. Then, after the positioning operation, the panel is blown by the nozzle and then the dust of the panel is removed by a sticky roller (the blow and the dust-removal operations are implemented for two panels at one time).

Then, the step P02 is implemented as moving the panel that has undergone the dust-removal and positioning operations to the lighting detection device A4 by the transportation device A3, so that the lighting detection device A4 implements the lighting detection for the panel. The transportation device A3 can comprise a suction nozzle, a motor, a screw rod, a linear guideway, etc. In this embodiment, the panel is sucked through the suction nozzle of the transportation device A3 and moved (by the motor drive) to the detection stage of the lighting detection device A4 for the positioning operation (two panels are sucked to move to the positioning dust-removal device A2 at one time, and the two panels on the positioning dust-removal device A2 are moved to the lighting detection device A4 at the same time). After the panels are positioned on the detection stage of the lighting detection device A4, the conducting probes, for example, can be used to couple with the panels to light the panels, and then the lighted panels can be photographed by an optical lens (e.g. CCD (charge-coupled device)) to inspect whether the panel has a defect, such as the defect of R, G, B or the Mura. To be noted, in the step P02, since the panels are not configured with the polarizers, the panels need to be covered by the polarizer of the lighting detection device A4 when the lighted panels are photographed by the optical lens.

Then, when the panel is detected as normal, the step P03 is implemented as moving the panel that has been detected as normal to a normal area by the transportation device A3. On the other hand, when the panel is detected as abnormal, the step P04 is implemented as moving the panel that has been detected as abnormal to a reexamination area (which can be disposed on a conveyer) by the transportation device A3. Herein, when the result of the lighting detection is normal, the transportation device A3 drives the suction nozzle to suck the normal panel to move it to the normal area, and the normal panel can be moved to the cassette or tray for the storage by the unloading device A5 (such as a robotic arm). Furthermore, when the result of the lighting detection is abnormal, the transportation device A3 drives the suction nozzle to suck the abnormal panel to move it to the reexamination area for the reexamination implemented by the operator, so as to make sure whether the panel has a defect.

Accordingly, in the first detection station A, the movement, loading and unloading of the panel are totally automated. Therefore, in comparison with the manual loading and unloading in the conventional art, the first detection station A can automatically implement the lighting detection of the panel, so as to increase the detection efficiency, decrease the manufacturing cost and time and enhance the product competitiveness.

After completing the automated lighting detection of the panel in the first detection station A, as shown in FIG. 1, the step S02 is implemented as assembling the panel with at least one polarizer and at least one circuit board to obtain a display module and moving the display module to a second detection station B by a second automatic loading device B1 for the automated optical detection and lighting detection of the display module. Herein, each of a plurality of plain panels is assembled with the upper and lower polarizers and then bonded with a controlling flexible circuit board (such as an FPC (flexible printed circuit)) so as to obtain a plurality of display modules, and then the second automatic loading device B1 moves the display modules to the second detection station B for the automated optical detection and lighting detection of the display modules.

Figure 3A:
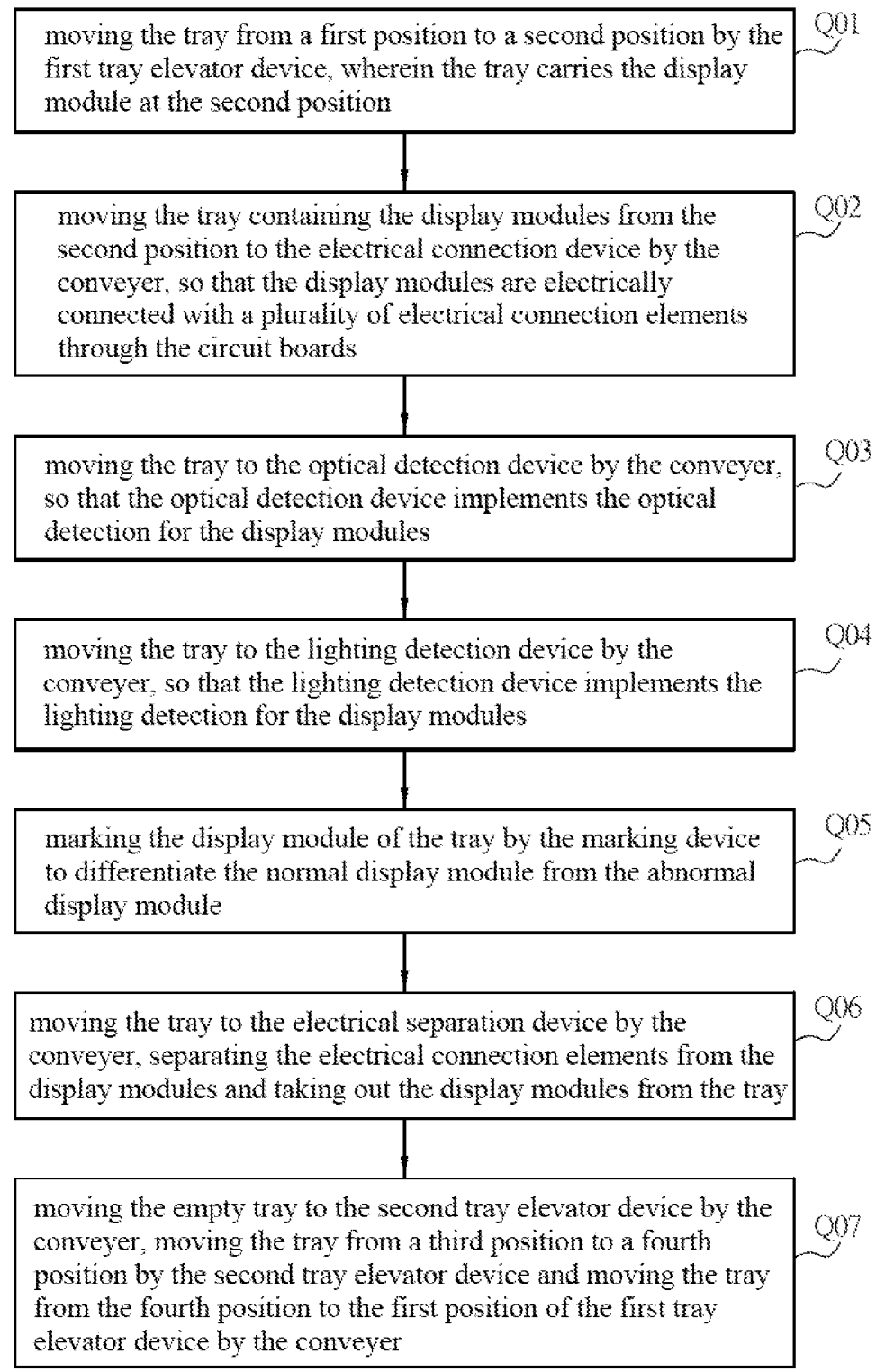
FIG. 3A is a schematic flowchart of the processes of the automated optical detection and lighting detection of the second detection station of FIG. 1.

As below, refer to FIGS. 3A and 3B to illustrate the processes of the optical detection and the lighting detection of the display modules automatically implemented by the second detection station B. FIG. 3A is a schematic flowchart of the processes of the automated optical detection and lighting detection of the second detection station B of FIG. 1, and FIG. 3B is a schematic diagram of the devices of the second detection station B of FIG. 1.

Figure 3B:
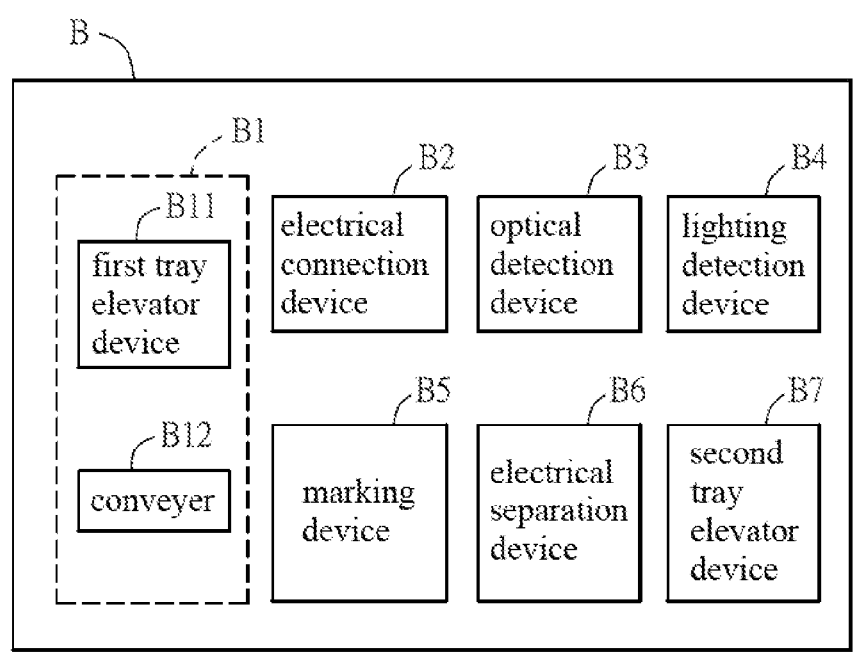
FIG. 3B is a schematic diagram of the devices of the second detection station B of FIG. 1.

As shown in FIG. 3B, the second detection station B is called a second API and can comprise a second automatic loading device B1, an electrical connection device B2, an optical detection device B3, a lighting detection device B4, a marking device B5, an electrical separation device B6 and a second tray elevator device B7. The second automatic loading device B1 comprises a first tray elevator device B11 and a conveyer B12. The first tray elevator device B11 can move at least one tray, and the conveyer B12 can carry and move the tray in the second detection station B. Herein, the conveyer B12 can carry the tray for an automatic circulating movement among the second automatic loading device B1, the electrical connection device B2, the optical detection device B3, the lighting detection device B4, the marking device B5, the electrical separation device B6 and the second tray elevator device B7, so as to drive the display module for a circulating movement in the second detection station B.

As shown in FIG. 3A, the optical detection and the lighting detection of the display module automatically implemented by the second detection station B comprise the steps Q01 to Q07.

First, the step Q01 is to move the tray from a first position to a second position by the first tray elevator device B11, wherein the tray carries the display module at the second position. In this embodiment, the first position is the position of a lower layer of the first tray elevator device B11, and the second position is the position of an upper layer of the first tray elevator device B11. Besides, the first tray elevator device B11 can move the empty tray from the first position of the lower layer to the second position of the upper layer. Furthermore, the display modules (ex. 8 display modules) can be disposed in the tray at the second position, and the tray containing the display modules can be carried by the conveyer B12 to be transported in the second detection station B.

Then, the step Q02 is implemented as moving the tray containing the display modules from the second position to the electrical connection device B2 by the conveyer B12, so that the display modules are electrically connected with a plurality of electrical connection elements through the circuit boards. Herein, the electrical connection element is a conducting probe for example, and the conducting probes are respectively connected with the electrical input terminals of the circuit boards of the display modules in a manual manner.

After the electrical connection is completed, the step Q03 is implemented as moving the tray to the optical detection device B3 by the conveyer B12, so that the optical detection device B3 implements the optical detection for the display modules. Because the display module comprises the circuit board (e.g. flexible circuit board), the optical detection device B3 can light the display modules through the circuit boards. The optical detection comprises, for example, detecting whether the displayed image has flicker, or the white-point correction, etc.

Then, the step Q04 is implemented as moving the tray to the lighting detection device B4 by the conveyer B12, so that the lighting detection device B4 implements the lighting detection for the display modules. Herein, a specific image is lighted (making the panel display a specific image) to ensure whether the connection of the circuit board and the IC driving are normal.

Then, the step Q05 is implemented as marking the display module of the tray by the marking device B5 to differentiate the normal display module from the abnormal display module. Because the lighting detection in the step Q04 has determined whether the display module is normal, the normal display module can be furnished with a sign by the marking device B5 (such as an inkjet device) so as to be marked normal (furnished with a pattern like "OK" for example). If the lighting detection shows the abnormal display module, the abnormal display module is furnished with a pattern like "NG", so that operators can easily recognize that.

Then, the step Q06 is implemented as moving the tray to the electrical separation device B6 by the conveyer B12, separating the electrical connection elements from the display modules and taking out the display modules from the tray. Herein, the electrical connection elements are electrically separated from the display modules in a manual manner, and the display modules are taken out (and disposed on the production line of the equipment).

The step Q07 is implemented as moving the empty tray to the second tray elevator device B7 by the conveyer B12, moving the tray from a third position to a fourth position by the second tray elevator device B7 and moving the tray from the fourth position to the first position of the first tray elevator device B11 by the conveyer B12. Because the display modules have been taken out in the step Q07, the tray is empty when arriving at the third position (the position of an upper layer) of the second tray elevator device B7. Then, the tray is moved from the third position of the upper layer to the fourth position of the lower layer by the second tray elevator device B7 and then automatically moved from the fourth position to the first position of the first tray elevator device B11 by the conveyer B12. Accordingly, the trays can be recycled, and the double-layer circulation can be called herein.

Accordingly, in the second detection station B, the tray containing the display modules is carried and automatically moved among the detection devices of the second detection station B by the conveyer B12. Therefore, in comparison with the manual loading and unloading in the conventional art, the second detection station B can automatically implement the optical detection and lighting detection of the display module, so as to increase the detection efficiency, decrease the manufacturing cost and time and enhance the product competitiveness.

As shown in FIG. 1, after completing the automated detections of the second detection station B, the lighting detection of the step S03 can be implemented. However, in this embodiment, before implementing the lighting detection of the step S03, the display module can be assembled with a backlight module to form a display device. Herein, each display device comprises the display module (comprising the panel, the polarizer, the circuit board, etc.) and the backlight module, and the display module and the backlight module are assembled by the sealant. Afterwards, before the lighting detection of the step S03, the display device needs to undergo another process (implemented by an automated machining machine M3).

Figure 4A:
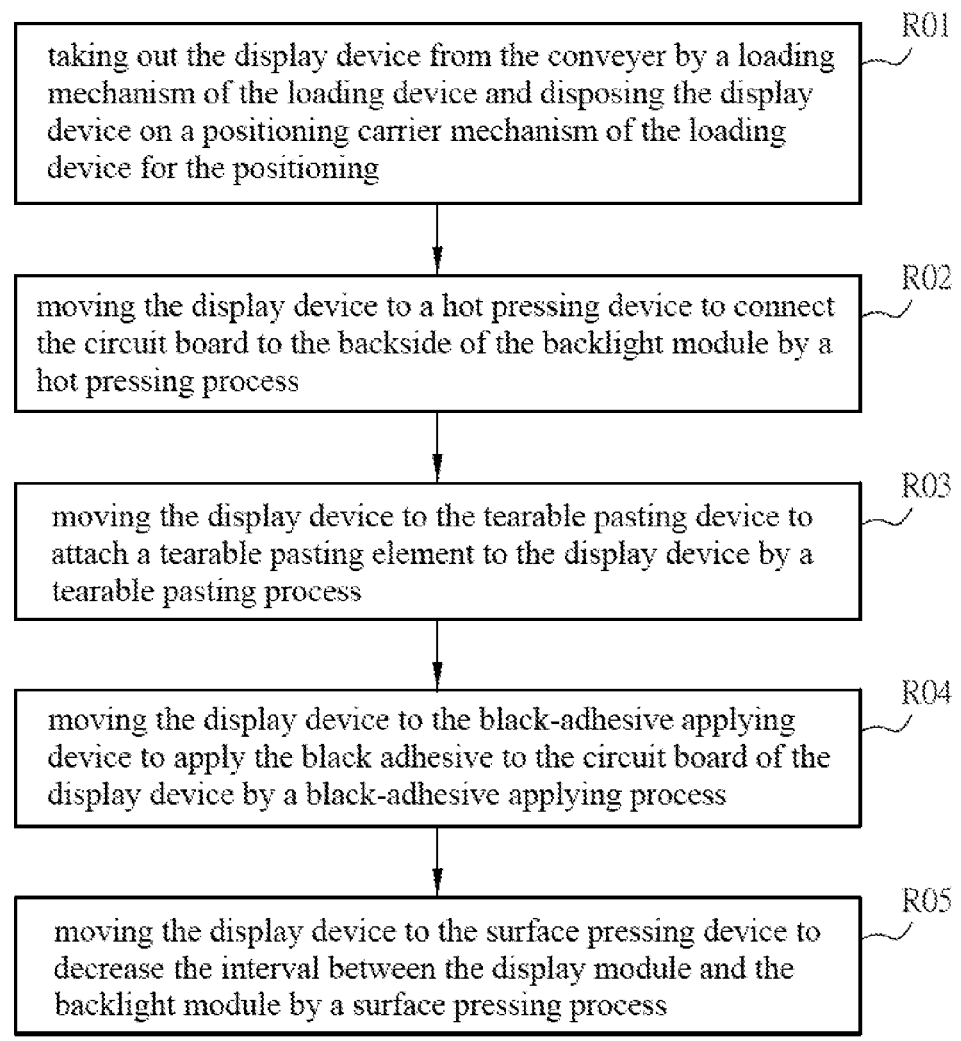
FIG. 4A is a schematic flowchart of the working process of an automated machining machine of an embodiment of the disclosure.

As below, refer to FIGS. 4A and 4B to illustrate the working process of an automated machining machine M3 of an embodiment of the disclosure. FIG. 4A is a schematic flowchart of the working process of the automated machining machine M3 of an embodiment of the disclosure, and FIG. 4B is a schematic diagram of the devices of the automated machining machine M3 of FIG. 4A.

Figure 4B:
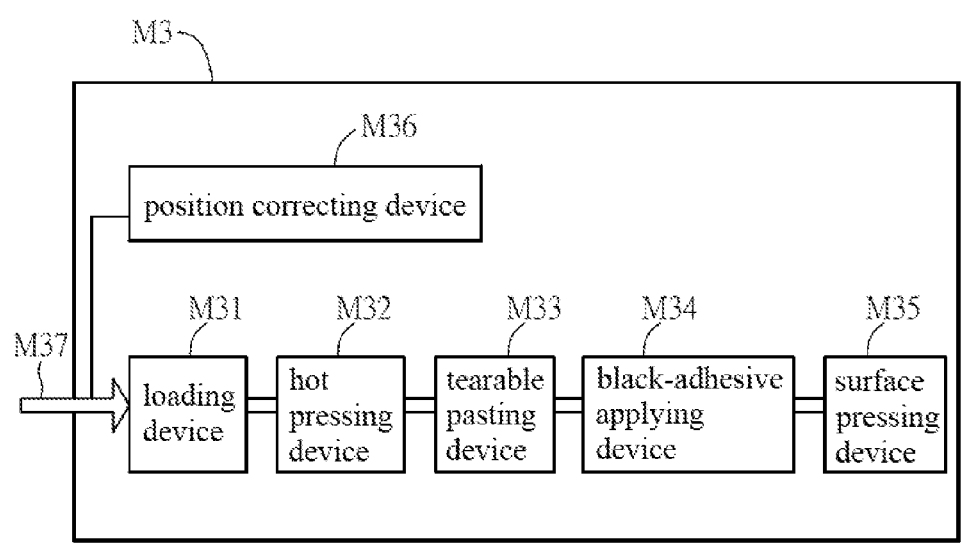
FIG. 4B is a schematic diagram of the devices of the automated machining machine of FIG. 4A.

As shown in FIG. 4B, the automated machining machine M3 can comprise a loading device M31, a hot pressing device M32, a tearable pasting device M33, a black-adhesive applying device M34 and a surface pressing device M35. Moreover, the automated machining machine M3 also can comprise a conveyer M37. The conveyer M37 can be sequentially connected to the loading device M31, the hot pressing device M32, the tearable pasting device M33, the black-adhesive applying device M34 and the surface pressing device M35, and the loading device M31, the hot pressing device M32, the tearable pasting device M33, the black-adhesive applying device M34 and the surface pressing device M35 are connected together to form the automated machining machine M3 so as to implement the automated machining operation for the display device.

First, the display devices comprising the backlight modules are sequentially moved on the conveyer M37, and before the display device is moved to the loading device M31, the position of the display device can be corrected by a position correcting device M36 which is disposed on a side of the conveyer M37, so that the loading device M31 can smoothly load and position the display device. The position correcting device M36 can comprise a position sensor disposed on a side of the conveyer M37 to sense the display device and correct the position thereof, so that the loading device M31 can smoothly load the display device.

As shown in FIG. 4A, the working process of the automated machining machine M3 can comprise the steps R01 to R05. The step R01 is taking out the display device from the conveyer M37 by a first loading/unloading mechanism of the loading device M31 and disposing the display device on a positioning carrier mechanism of the loading device M31 for the positioning. Because the position of the display device has been corrected by the position correcting device M36, the first loading/unloading mechanism of the loading device M31 can smoothly take out the display devices from the conveyer M37 and dispose them on the positioning carrier mechanism of the loading device M31 for the positioning. The first loading/unloading mechanism can comprise, for example, nozzle and sliding stage or robotic arm. Herein, the first loading/unloading mechanism sucks the display device for the movement on the sliding stage by the nozzle, and thereby the loading/unloading time can be controlled. Besides, the positioning carrier mechanism can comprise a positioning carrier stage (which can accommodate four display devices for example) and position the display devices, and then the subsequent processes can be correctly implemented. The positioning carrier mechanism can use the pneumatic cylinder to position the display devices.

Then, the step R02 is implemented as moving the display device to a hot pressing device M32 to connect the circuit board to the backside of the backlight module by a hot pressing process. Herein, the hot pressing device M32 can comprise a second loading/unloading mechanism, a loading stage, a hot pressing mechanism, a turning mechanism and a hot pressing unloading positioning mechanism.

The second loading/unloading mechanism can take out the display device (e.g. four display devices) from the previous process (referring to the loading device M31) and dispose it on the loading stage for the positioning. Herein, the second loading/unloading mechanism also sucks the display device by the nozzle for the movement on the sliding stage, and thereby the loading and unloading time can be controlled. Besides, the loading stage can carries the display devices acquired from the second loading/unloading mechanism and move the display devices to the hot pressing mechanism. The hot pressing mechanism can connect the circuit board to the backside of the backlight module by the hot pressing process. The backside of the backlight module has at least one hot-melt pillar and the circuit board having at least one opening is bent to the backside of the backlight module, so that the hot-melt pillar on the backside of the backlight module can pass through the corresponding opening of the circuit board. Then, after the hot-melt pillar passing through the opening is melted by the hot pressing of the hot pressing process, the flexible circuit board is fixed to the backside of the backlight module (two display devices can be processed at the same time). Moreover, the turning mechanism can turn over the display device according to the production requirement (if the display device needn't be turned over, the turning mechanism can be removed or made inoperative). In addition, the second loading/unloading mechanism can take out the display device that has undergone the hot pressing and dispose it on the hot pressing loading positioning mechanism, which can move and position the display device for the following process.

Then, the step R03 is implemented as moving the display device to the tearable pasting device M33 to attach a tearable pasting element to the display device by a tearable pasting process. Herein, the tearable pasting device M33 attaches a tearable pasting element on the protection film that is pasted on the surface of the display device by a tearable pasting process, so that the user can conveniently tear off the protection film in the next process. The tearable pasting device M33 can comprise a third loading/unloading mechanism, a tearing mechanism and a tearable pasting positioning mechanism. The third loading/unloading mechanism can take out the display device from the previous process (referring to the hot pressing unloading positioning mechanism of the hot pressing process) and dispose it on the tearable pasting positioning mechanism. Herein, the third loading/unloading mechanism also sucks the display device by the nozzle for the movement on the sliding stage, and thereby the loading and unloading time can be controlled. The tearing mechanism can tear off the tearable pasting element and attach it to the corresponding position of the protection film of the display device (one piece by one piece). The third loading/unloading mechanism can take out the display device that has furnished with the tearable pasting element and dispose it on the tearable pasting positioning mechanism, so that the tearable pasting positioning mechanism can move and position the display device for the next process.

Then, the step R04 is implemented as moving the display device to the black-adhesive applying device M34 to apply the black adhesive to the circuit board of the display device by a black-adhesive applying process. Herein, the black-adhesive applying device M34 can comprise a fourth loading/unloading mechanism, at least one first transportation mechanism, at least one black-adhesive applying mechanism and a first unloading mechanism. The fourth loading/unloading mechanism can take out the display device from the previous process (referring to, for example, the tearable pasting positioning mechanism of the tearable pasting process) and dispose the display device on the first transportation mechanism. Herein, the fourth loading/unloading mechanism also sucks the display device by the nozzle for the movement on the sliding stage, and thereby the loading and unloading time can be controlled. The first transportation mechanism moves the display device to the pasting position of the black-adhesive applying mechanism, so that the light-blocking adhesive is applied to the corresponding position of the display device by the black-adhesive applying mechanism (wherein two display devices can be processed at the same time). The black-adhesive applying mechanism applies the light-blocking adhesive to the connection terminal portion between the (flexible) circuit board and the panel. Herein, the black-adhesive applying mechanism peels off the black adhesive from the material tape and applies the black adhesive to the connection terminal portion under the scanning and positioning of the CCD optical lens. Thereby, the light-blocking purpose (avoiding the light leakage) can be achieved and the connection terminals between the flexible circuit board and the panel can be protected. In different embodiments, two first transportation mechanisms and two black-adhesive applying mechanisms may be disposed according to the process requirement. Besides, the first unloading mechanism can move the display device that has undergone the black-adhesive applying process out of the black-adhesive applying mechanism for the next process.

Then, the step R05 is implemented as moving the display device to the surface pressing device M35 to decrease the interval between the display module and the backlight module by a surface pressing process. Herein, the surface pressing device M35 can comprise a fifth loading/unloading mechanism, a second transportation mechanism, a pressing mechanism and a second unloading mechanism. The fifth loading/unloading mechanism takes out the display device from the previous process (referring to, for example, the first unloading mechanism of the black-adhesive applying process) and disposes it on the second transportation mechanism. Herein, the fifth loading/unloading mechanism also sucks the display device by the nozzle for the movement on the sliding stage, and thereby the loading and unloading time can be controlled. The second transportation mechanism can move the display device to the corresponding pressing position of the pressing mechanism, and the pressing mechanism can implement the surface pressing processes for the display devices (to press the display module and the backlight module, wherein four sets of the display module and the backlight module can be pressed at the same time) to uniform and decrease the interval between the display module and the backlight module. Moreover, the second unloading mechanism takes out the display device that has undergone the surface pressing process from the pressing mechanism and moves it to an unloading stage of the second unloading mechanism so that the display device can be moved to the conveyer M37.

To be noted, in the above-mentioned automated machining machine M3, the display device is machined sequentially through the loading device M31, the hot pressing device M32, the tearable pasting device M33, the black-adhesive applying device M34 and the surface pressing device M35. However, the machining processes can be adjusted in order according to the practical production requirement or can be increased or decreased according to the practical requirement, and this disclosure is not limited thereto. For example, if the display device needn't be furnished with the black adhesive, the black-adhesive applying device M34 can be removed and the tearable pasting device M33 and the surface pressing device M35 can be connected together. Therefore, the application thereof exhibits a very high flexibility.

Figure 5A:
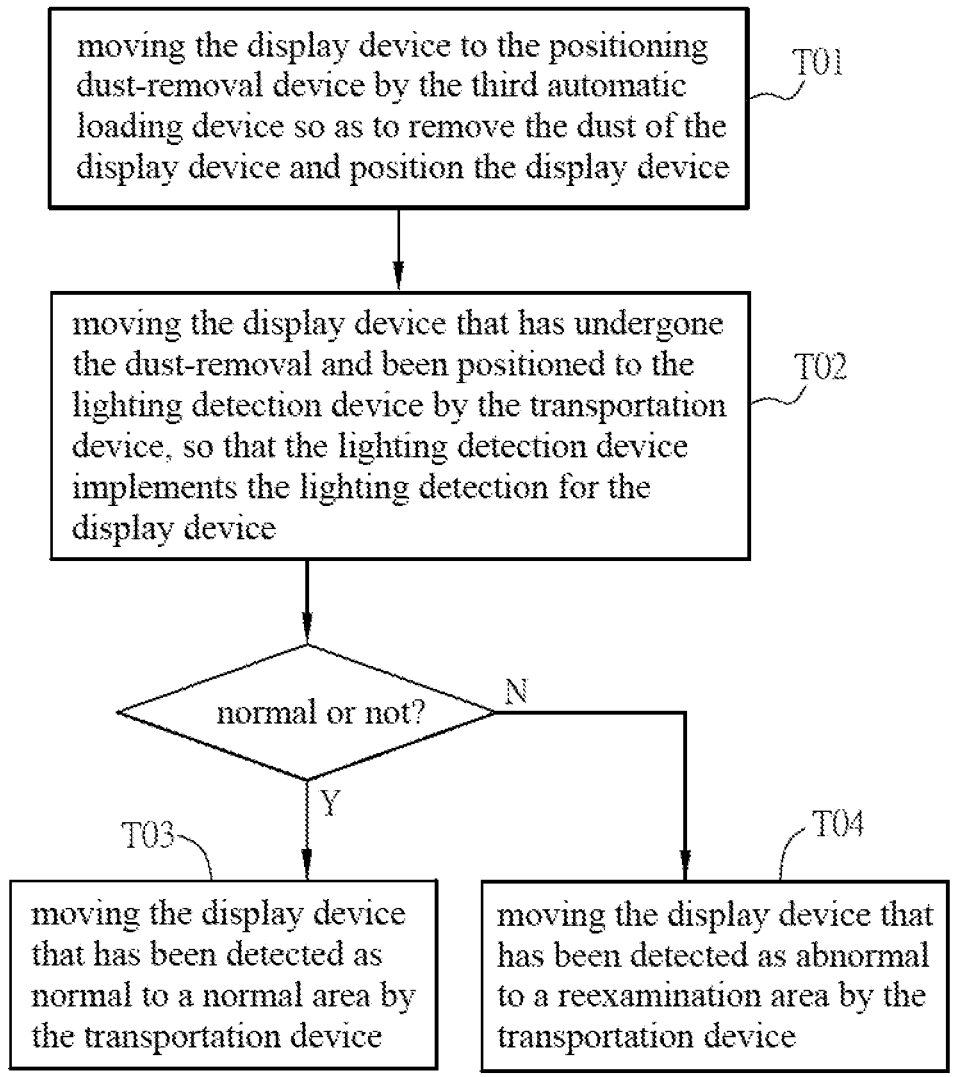
FIG. 5A is a schematic flowchart of the process of the automated lighting detection of the third detection station of FIG. 1.
Figure 5B:
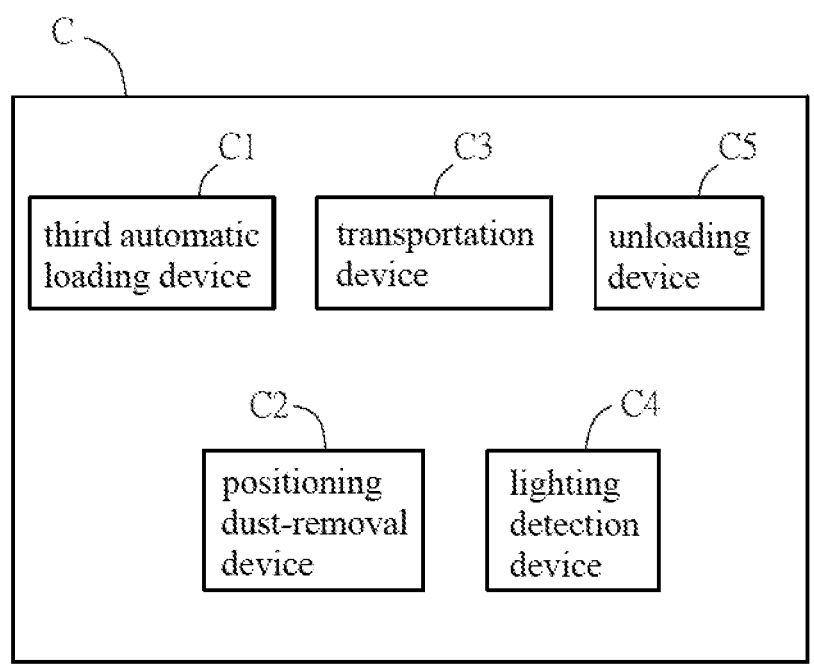
FIG. 5B is a schematic diagram of the devices of the third detection station C of FIG. 1.

As shown in FIG. 1, after completing the process of the automated machining machine M3, the step S03 of the lighting detection is implemented, wherein a third automatic loading device C1 moves the display device to a third detection station C for the automated lighting detection of the display device. Refer to FIGS. 5A and 5B to illustrate the process of the lighting detection of the display device automatically implemented by the third detection station C. FIG. 5A is a schematic flowchart of the process of the automated lighting detection of the third detection station C of FIG. 1, and FIG. 5B is a schematic diagram of the devices of the third detection station C of FIG. 1.

As shown in FIG. 5B, the third detection station C can be called the third API, and like the first detection station A, can comprise a third automatic loading device C1, a positioning dust-removal device C2, a transportation device C3, a lighting detection device C4 and an unloading device C5. Moreover, as shown in FIG. 5A, the lighting detection of the display device automatically implemented by the third detection station C comprises the steps T01 to T04.

First, the step T01 is implemented as moving the display device to the positioning dust-removal device C2 by the third automatic loading device C1 so as to remove the dust of the display device and position the display device. In this embodiment, likewise, the two display devices are sucked by a robotic arm at the same time and then moved to the positioning stage of the positioning dust-removal device C2. Then, after the positioning operation, the display devices are blown by the nozzle and then the dust of the display devices is removed by a sticky roller.

Then, the step T02 is implemented as moving the display device that has undergone the dust-removal and been positioned to the lighting detection device C4 by the transportation device C3, so that the lighting detection device C4 implements the lighting detection for the display device. The transportation device C3 can comprise a suction nozzle, a motor, a screw rod, a linear guideway, etc. In this embodiment, the display device is moved through the suction nozzle of the transportation device C3 (by the motor drive) to the lighting detection device C4 and positioned (two display devices are sucked to move to the positioning dust-removal device C2 at one time, and the two display devices on the positioning dust-removal device C2 are moved to the lighting detection device C4 at the same time). After the display devices are positioned on the lighting detection device C4, the conducting probes can be used to couple with the display devices to light the display devices, and then the lighted display devices can be photographed by an optical lens (e.g. CCD) to inspect whether the display device has a defect, such as the defect of R, G, B or the Mura.

Then, when the display device is detected as normal, the step T03 is implemented as moving the display device that has been detected as normal to a normal area by the transportation device C3. On the other hand, when the display device is detected as abnormal, the step T04 is implemented as moving the display device that has been detected as abnormal to a reexamination area by the transportation device C3. Herein, when the result of the lighting detection is normal, the transportation device C3 drives the suction nozzle to suck the normal display device to move it to the normal area, and the normal display device can be moved to the cassette or tray for the storage by the unloading device C5. Furthermore, when the result of the lighting detection is abnormal, the transportation device C3 drives the suction nozzle to suck the abnormal panel to move it to the reexamination area for the reexamination implemented by the operator, so as to make sure whether the display device has a defect.

Accordingly, in the third detection station C, the movement, loading and unloading of the display device are totally automated. Therefore, in comparison with the manual loading and unloading in the conventional art, the third detection station C can automatically implement the lighting detection of the display device, so as to increase the detection efficiency, decrease the manufacturing cost and time and enhance the product competitiveness.

Figure 6:
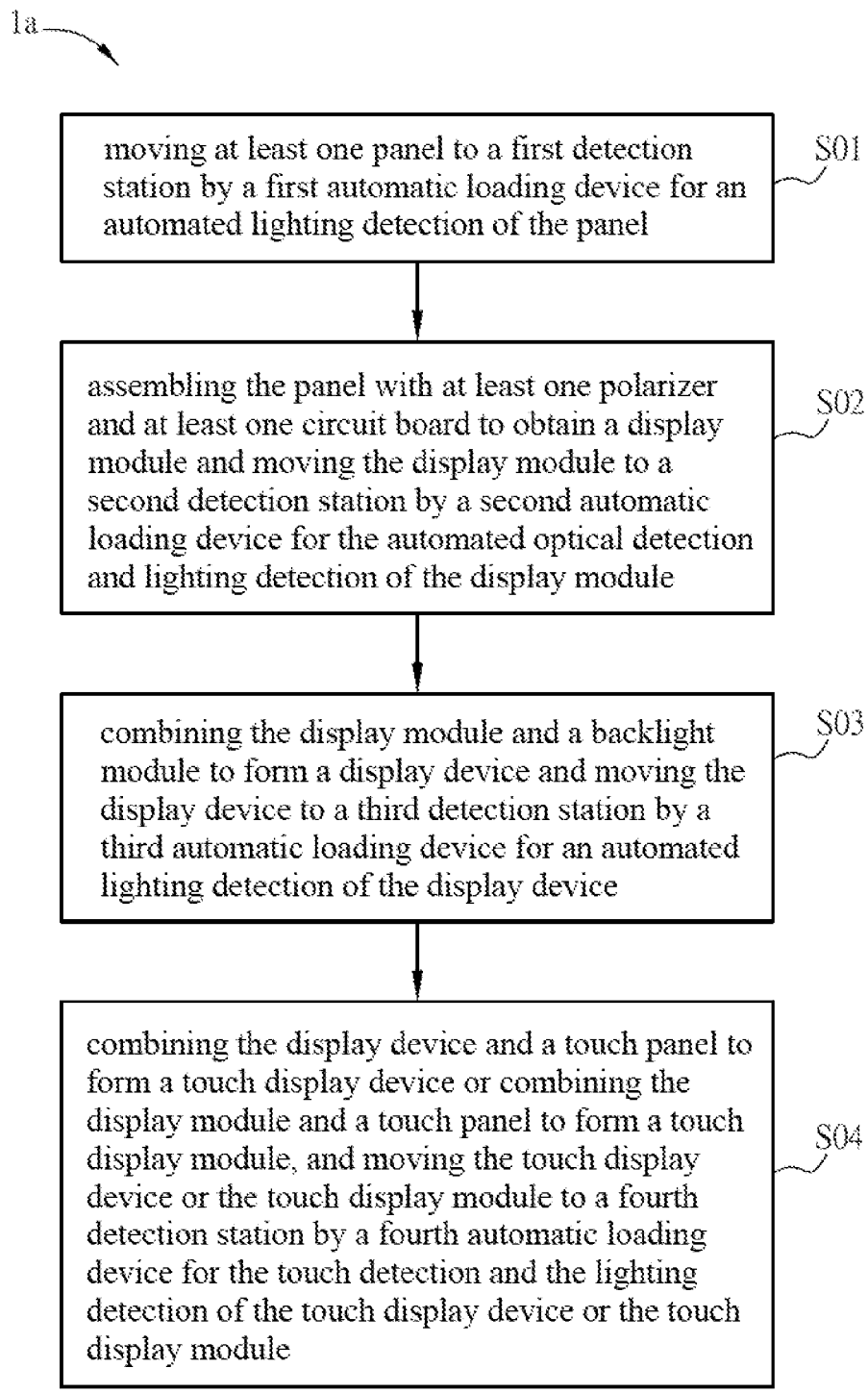
FIG. 6 is a schematic flowchart of another automated detection method of an embodiment of the disclosure.

Moreover, refer to FIG. 6, which is a schematic flowchart of another automated detection method 1a of an embodiment of the disclosure.

In addition to the steps S01 to S03, the automated detection method 1a can further comprise a step S04 of combining the display device and a touch panel to form a touch display device or combining the display module and a touch panel to form a touch display module, and moving the touch display device or the touch display module to a fourth detection station D by a fourth automatic loading device D1 for the touch detection and the lighting detection of the touch display device or the touch display module. Herein, according to different requirements, there may be two kinds of the materials in the step S04 for the touch detection and the lighting detection, wherein one kind is the touch display device comprising the backlight module, the touch panel and the display module and the other is the touch display module comprising the touch panel and the display module without the backlight module.

Figure 7A:
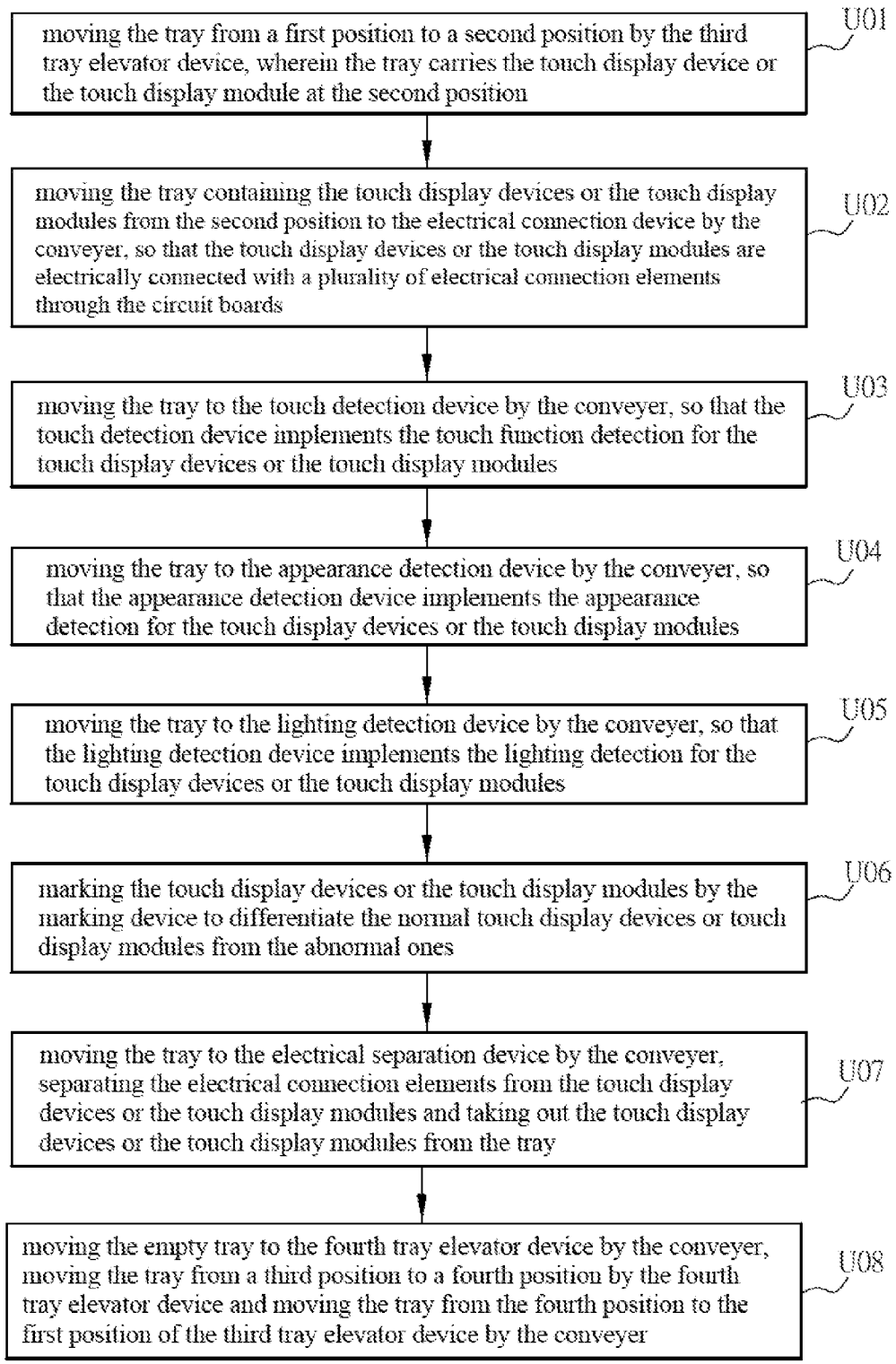
FIG. 7A is a schematic flowchart of the process of the automated touch detection and lighting detection of the fourth detection station of FIG. 6.

As below, refer to FIGS. 7A and 7B to illustrate the process of the touch detection and the lighting detection of the touch display device or the touch display module automatically implemented by the fourth detection station D. FIG. 7A is a schematic flowchart of the process of the automated touch detection and lighting detection of the fourth detection station D of FIG. 6, and FIG. 7B is a schematic diagram of the devices of the fourth detection station D of FIG. 6.

Figure 7B:
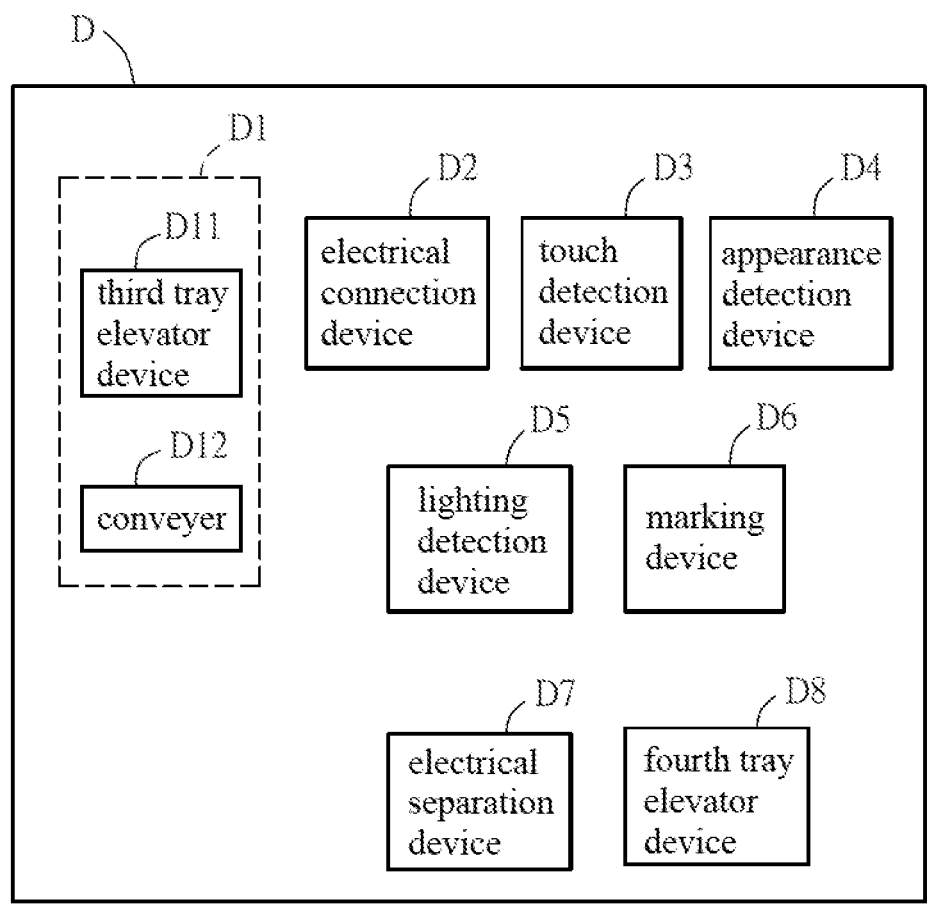
FIG. 7B is a schematic diagram of the devices of the fourth detection station of FIG. 6.

As shown in FIG. 7B, the fourth detection station D is called the fourth API and can comprise a fourth automatic loading device D1, an electrical connection device D2, a touch detection device D3, an appearance detection device D4, a lighting detection device B5, a marking device D6, an electrical separation device D7 and a fourth tray elevator device D8. The fourth automatic loading device D1 comprises a third tray elevator device D11 and a conveyer D12. The third tray elevator device D11 can move at least one tray, and the conveyer D12 can carry and move the tray in the fourth detection station D. Herein, the conveyer D12 can carry the tray for the movement among the fourth automatic loading device D1, the electrical connection device D2, the touch detection device D3, the appearance detection device D4, the lighting detection device D5, the marking device D6, the electrical separation device D7 and the fourth tray elevator device D8, so as to drive the touch display device or the touch display module to move in the fourth detection station D.

As shown in FIG. 7A, the touch detection and the lighting detection of the touch display device or the touch display module automatically implemented by the fourth detection station D comprise the steps U01 to U08.

First, the step U01 is to move the tray from a first position to a second position by the third tray elevator device D11, wherein the tray carries the touch display device or the touch display module at the second position. In this embodiment, the first position is the position of a lower layer of the fourth automatic loading device D1 (the third tray elevator device D11), and the second position is the position of an upper layer of the fourth automatic loading device D1 (the third tray elevator device D11). Besides, the third tray elevator device D11 can move the empty tray from the first position of the lower layer to the second position of the upper layer. Furthermore, the touch display devices or the touch display modules (ex. 8 touch display devices or touch display modules) can be disposed in the tray at the second position in a manual manner, so that the conveyer D12 can carry the tray containing the touch display devices or the touch display modules to move among other devices of the fourth detection station D.

Then, the step U02 is implemented as moving the tray containing the touch display devices or the touch display modules from the second position to the electrical connection device D2 by the conveyer D12, so that the touch display devices or the touch display modules are electrically connected with a plurality of electrical connection elements through the circuit boards. Herein, the electrical connection element is a conducting probe for example, and the conducting probes are connected with the electrical input terminals of the circuit boards of the touch display devices or the touch display modules in a manual manner.

After the electrical connection is completed, the step U03 can be implemented as moving the tray to the touch detection device D3 by the conveyer D12, so that the touch detection device D3 implements the touch function detection for the touch display devices or the touch display modules. Herein, the touch detection device D3 will inspect whether the touch display devices or the touch display modules have normal touch function.

Then, the step U04 is implemented as moving the tray to the appearance detection device D4 by the conveyer D12, so that the appearance detection device D4 implements the appearance detection for the touch display devices or the touch display modules. Herein, an optical lens, for example, is used to inspect whether the touch display devices or the touch display modules have physical defects to determine whether a breach or a scratch occurs on the appearance.

Then, the step U05 is implemented as moving the tray to the lighting detection device D5 by the conveyer D12, so that the lighting detection device D5 implements the lighting detection for the touch display devices or the touch display modules. Herein, the panel is controlled to be lighted to display a specific image (making the panel display a specific image) to ensure whether the panel, the connection of the circuit board and the IC driving are normal.

Then, the step U06 is implemented as marking the touch display devices or the touch display modules by the marking device D6 to differentiate the normal touch display devices or touch display modules from the abnormal ones. Herein, because the lighting detection in the step U05 has determined whether the touch display devices or the touch display modules are normal, the normal touch display devices or touch display modules can be furnished with a sign by the marking device D6 (such as an inkjet device) so as to be marked normal (furnished with a pattern like "OK" for example). If the lighting detection shows the abnormal touch display devices or touch display modules, the abnormal touch display devices or touch display modules are furnished with a pattern like "NG", so that operators can easily recognize that.

Then, the step U07 is implemented as moving the tray to the electrical separation device D7 by the conveyer D12, separating the electrical connection elements from the touch display devices or the touch display modules and taking out the touch display devices or the touch display modules from the tray. Herein, the electrical connection elements are separated from the touch display devices or the touch display modules in a manual manner, and the touch display devices or the touch display modules are taken out and disposed on the production line of the equipment.

The step U08 is implemented as moving the empty tray to the fourth tray elevator device D8 by the conveyer D12, moving the tray from a third position to a fourth position by the fourth tray elevator device D8 and moving the tray from the fourth position to the first position of the third tray elevator device D11 by the conveyer D12. Because the touch display devices or the touch display modules have been taken out in the step U07, the tray is empty when arriving at the fourth tray elevator device D8. Then, the tray is moved from the third position of the upper layer to the fourth position of the lower layer by the fourth tray elevator device D8 and then moved from the fourth position to the first position of the third tray elevator device D11 by the conveyer D12. Accordingly, the trays can be recycled, and the double-layer circulation can be called herein.

Accordingly, in the fourth detection station D, the movement, loading and unloading of the touch display device or the touch display module are achieved by the movement of the conveyer D12 among the devices of the fourth detection station D. Therefore, in comparison with the manual loading and unloading in the conventional art, the fourth detection station D can automatically implement the touch detection and the lighting detection of the touch display device or the touch display module, so as to increase the detection efficiency, decrease the manufacturing cost and time and enhance the product competitiveness.

Summarily, the automated detection method of this disclosure comprises the steps of: moving at least one panel to the first detection station by the first automatic loading device for the automated lighting detection of the panel; assembling the panel with at least one polarizer and at least one circuit board to obtain a display module and moving the display module to the second detection station by the second automatic loading device for the automated optical detection and lighting detection of the display module; and combining the display module and the backlight module to form a display device and moving the display device to the third detection station by the third automatic loading device for the automated lighting detection of the display device. Moreover, in one embodiment, the automated detection method can further comprise the steps of: combining the display device and a touch panel to form a touch display device or combining the display module and a touch panel to form a touch display module, and moving the touch display device or the touch display module to the fourth detection station by the fourth automatic loading device for the touch detection and the lighting detection of the touch display device or the touch display module. Therefore, in comparison with the manual loading and unloading in the conventional art, the automated detection method of this disclosure can automatically implement the loading, unloading and detection, so as to increase the detection efficiency, decrease the manufacturing cost and time and enhance the product competitiveness.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An automated detection method, comprising steps of:
    moving at least one panel to a first detection station by a first automatic loading device for an automated lighting detection of the panel;
    assembling the panel with at least one polarizer and at least one circuit board to obtain a display module and moving the display module to a second detection station by a second automatic loading device for an automated optical detection and an automated lighting detection of the display module; and
    combining the display module and a backlight module to form a display device and moving the display device to a third detection station by a third automatic loading device for an automated lighting detection of the display device.

2. The automated detection method as recited in claim 1, wherein the panel is carried by a cassette, a tray or a conveyer and moved to the first detection station by the first automatic loading device.

3. The automated detection method as recited in claim 1, wherein the first automatic loading device is a four-axis or six-axis robotic arm.

4. The automated detection method as recited in claim 1, wherein the lighting detection of the panel automatically implemented by the first detection station comprises steps of:
   moving the panel to a positioning dust-removal device by the first automatic loading device so as to remove the dust of the panel and position the panel;
   moving the panel that has undergone the dust-removal and been positioned to a lighting detection device by a transportation device, so that the lighting detection device implements the lighting detection for the panel;
   moving the panel that has been detected as normal to a normal area by the transportation device when the result of the panel's detection is normal; and
   moving the panel that has been detected as abnormal to a reexamination area by the transportation device when the result of the panel's detection is abnormal.

5. The automated detection method as recited in claim 1, wherein the second automatic loading device comprises a first tray elevator device and a conveyer, the first tray elevator device moves at least one tray, and the conveyer carries and moves the tray in the second detection station.

6. The automated detection method as recited in claim 5, wherein the lighting detection of the display module automatically implemented by the second detection station comprises steps of:
   moving the tray from a first position to a second position by the first tray elevator device, wherein the tray carries the display module at the second position;
   moving the tray containing the display module from the second position to an electrical connection device by the conveyer, so that the display module is electrically connected with a plurality of electrical connection elements through the circuit board;
   moving the tray to an optical detection device by the conveyer, so that the optical detection device implements the optical detection for the display module;
   moving the tray to a lighting detection device by the conveyer, so that the lighting detection device implements the lighting detection for the display module;
   marking the display module of the tray by a marking device to differentiate the normal display module from the abnormal display module;
   moving the tray to an electrical separation device by the conveyer, separating the electrical connection elements from the display module and taking out the display module from the tray; and
   moving the empty tray to a second tray elevator device by the conveyer, moving the tray from a third position to a fourth position by the second tray elevator device and moving the tray from the fourth position to the first position of the first tray elevator device by the conveyer.

7. The automated detection method as recited in claim 1, wherein before the display device is moved to the third detection station by the third automatic loading device, the automated detection method further comprises steps of:
   taking out the display device from a conveyer by a first loading/unloading mechanism of a loading device and disposing the display device on a positioning carrier mechanism of the loading device for the positioning;
   moving the display device to a hot pressing device to connect the circuit board to the backside of the backlight module by a hot pressing process;
   moving the display device to a tearable pasting device to attach a tearable pasting element to the display device by a tearable pasting process;
   moving the display device to a black-adhesive applying device to apply a black adhesive to the circuit board of the display device by a black-adhesive applying process; and
   moving the display device to a surface pressing device to decrease the interval between the display module and the backlight module by a surface pressing process.

8. The automated detection method as recited in claim 7, wherein before the display device is taken out from the conveyer by the first automatic loading/unloading mechanism of the loading device, the position of the display device is corrected by a position correcting device which is disposed on a side of the conveyer.

9. The automated detection method as recited in claim 7, wherein the hot pressing device comprises a second loading/unloading mechanism, a loading stage, a hot pressing mechanism, a turning mechanism and a hot pressing unloading positioning mechanism, the second loading/unloading mechanism takes out the display device from the previous process and disposes the display device on the loading stage and then the display device is moved to the hot pressing mechanism, the hot pressing mechanism connects the circuit board to the backside of the backlight module by the hot pressing process, the turning mechanism turns over the display device, and the hot pressing unloading positioning mechanism moves and positions the display device.

10. The automated detection method as recited in claim 7, wherein the tearable pasting device comprises a third loading/unloading mechanism, a tearing mechanism and a tearable pasting positioning mechanism, the third loading/unloading mechanism takes out the display device from the previous process and disposes the display device on the tearable pasting positioning mechanism, the tearing mechanism tears off the tearable pasting element and attach the tearable pasting element to a corresponding position of the display device, and the tearable pasting positioning mechanism moves and positions the display device.

11. The automated detection method as recited in claim 7, wherein the black-adhesive applying device comprises a fourth loading/unloading mechanism, at least one first transportation mechanism, at least one black-adhesive applying mechanism and a first unloading mechanism, the fourth loading/unloading mechanism takes out the display device from the previous process and disposes the display device on the first transportation mechanism, the first transportation mechanism moves the display device to a pasting position of the black-adhesive applying mechanism, a light-blocking adhesive is applied to a corresponding position of the display device by the black-adhesive applying mechanism, and the first unloading mechanism moves the display device that has undergone the black-adhesive applying process out of the black-adhesive applying mechanism.

12. The automated detection method as recited in claim 7, wherein the surface pressing device comprises a fifth loading/unloading mechanism, a second transportation mechanism, a pressing mechanism and a second unloading mechanism, the fifth loading/unloading mechanism takes out the display device from the previous process and disposes the display device on the second transportation mechanism, the second transportation mechanism moves the display device to a pressing position of the pressing mechanism, the pressing mechanism implements a surface pressing processes for the display device to decrease the interval between the display module and the backlight module, and the second unloading mechanism moves the display device that has undergone the surface pressing process out of the surface pressing mechanism.

13. The automated detection method as recited in claim 1, wherein the lighting detection of the display device automatically implemented by the third detection station comprises steps of:

moving the display device to a positioning dust-removal device by the third automatic loading device so as to remove the dust of the display device and position the display device;

moving the display device that has undergone the dust-removal and been positioned to a lighting detection device by a transportation device, so that the lighting detection device implements the lighting detection for the display device;

moving the display device that has been detected as normal to a normal area by the transportation device when the result of the detection of the display device is normal; and moving the display device that has been detected as abnormal to a reexamination area by the transportation device when the result of the detection of the display device is abnormal.

14. The automated detection method as recited in claim 1, further comprising a step of:

combining the display device and a touch panel to form a touch display device or combining the display module and a touch panel to form a touch display module, and moving the touch display device or the touch display module to a fourth detection station by a fourth automatic loading device for a touch detection and a lighting detection of the touch display device or the touch display module.

15. The automated detection method as recited in claim 14, wherein the fourth automatic loading device comprises a third tray elevator device and a conveyer, the third tray elevator device moves at least one tray, and the conveyer carries and moves the tray in the fourth detection station.

16. The automated detection method as recited in claim 15, wherein the touch detection and the lighting detection of the touch display device or the touch display module automatically implemented by the fourth detection station comprise steps of:

moving the tray from a first position to a second position by the third tray elevator device, wherein the tray carries the touch display device or the touch display module at the second position;

moving the tray containing the touch display device or the touch display module from the second position to an electrical connection device by the conveyer, so that the touch display device or the touch display module is electrically connected with a plurality of electrical connection elements through the circuit board;

moving the tray to the touch detection device by the conveyer, so that the touch detection device implements a touch function detection for the touch display device or the touch display module;

moving the tray to an appearance detection device by the conveyer, so that the appearance detection device implements an appearance detection for the touch display device or the touch display module;

moving the tray to a lighting detection device by the conveyer, so that the lighting detection device implements a lighting detection for the touch display device or the touch display module;

marking the touch display device or the touch display module by a marking device to differentiate the normal touch display device or touch display module from the abnormal one;

moving the tray to an electrical separation device by the conveyer, separating the electrical connection elements from the touch display device or the touch display module and taking out the touch display device or the touch display module from the tray; and moving the empty tray to a fourth tray elevator device by the conveyer, moving the tray from a third position to a fourth position by the fourth tray elevator device and moving the tray from the fourth position to the first position of the third tray elevator device by the conveyer.

* * * * *